(12) United States Patent
Juang

(10) Patent No.: US 7,751,504 B2
(45) Date of Patent: Jul. 6, 2010

(54) FREQUENCY MODULATION-FREQUENCY SHIFT KEYING DEMODULATOR

(75) Inventor: Kai-Cheung Juang, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 926 days.

(21) Appl. No.: 11/476,736

(22) Filed: Jun. 29, 2006

(65) Prior Publication Data

US 2007/0133715 A1 Jun. 14, 2007

(30) Foreign Application Priority Data

Dec. 14, 2005 (TW) .............................. 94144313 A

(51) Int. Cl.
*H03D 3/00* (2006.01)
*H04L 27/14* (2006.01)

(52) U.S. Cl. ...................... 375/334; 375/324

(58) Field of Classification Search ................. 375/322, 375/324, 329, 334
See application file for complete search history.

(56) References Cited

U.S. PATENT DOCUMENTS

| | | | |
|---|---|---|---|
| 4,054,840 A | 10/1977 | Sato | |
| 4,451,792 A * | 5/1984 | Gay | ............................ 329/319 |
| 5,053,717 A * | 10/1991 | Schulz et al. | ................. 329/300 |
| 5,077,538 A * | 12/1991 | Gehrt et al. | ................. 329/319 |
| 5,394,109 A | 2/1995 | Simard | |
| 6,724,247 B2 | 4/2004 | Mattisson et al. | |
| 6,751,272 B1 * | 6/2004 | Burns et al. | ................. 375/340 |
| 6,798,678 B2 | 9/2004 | Komurasaki et al. | |
| 6,847,255 B2 | 1/2005 | Petrovic et al. | |
| 2006/0029209 A1 * | 2/2006 | Moton et al. | ........... 379/374.02 |

FOREIGN PATENT DOCUMENTS

| | | |
|---|---|---|
| TW | 469719 | 12/2001 |
| TW | I 239143 | 9/2005 |

* cited by examiner

*Primary Examiner*—David B Lugo
(74) *Attorney, Agent, or Firm*—Harness, Dickey & Pierce, P.L.C.

(57) ABSTRACT

A frequency modulation-frequency shift keying (FM/FSK) demodulator is provided, including a modulation signal input terminal for receiving a first modulation signal; a phase shifter for receiving the first modulation signal and then shifting its phase to output a second modulation signal; a multiplier connected to the modulation signal input terminal and the output of the phase shifter for multiplying the first modulation signal and the second modulation signal together to output a demodulation signal; an adder having at least two input terminals and an output terminal where the first input terminal receives the demodulation signal; a direct current (DC) compensation unit connected to the output terminal of the adder for compensating the DC of the demodulation signal and low-frequency offsets, and a demodulation signal output terminal connected to the output of the adder for outputting the demodulation signal.

10 Claims, 5 Drawing Sheets

US 7,751,504 B2

FREQUENCY MODULATION-FREQUENCY SHIFT KEYING DEMODULATOR

CROSS-REFERENCE TO RELATED APPLICATIONS

This non-provisional application claims priority under 35 U.S.C. §119(a) on Patent Application No(s). 094144313 filed in Taiwan, R.O.C. on Dec. 14, 2005, the entire contents of which are hereby incorporated by reference.

BACKGROUND OF THE INVENTION

1. Field of Invention

This invention relates to a demodulation, in particular, to a frequency modulation or frequency shift keying (FM/FSK) demodulator.

2. Related Art

FIG. 1 shows a basic structure of conventional FM/FSK demodulator. It contains: a multiplier 21 and a phase shifter 11. The function of the FM/FSK demodulator is to convert a frequency-varying input signal into an amplitude-varying output signal. FIG. 2 is a schematic view showing the curve of the input frequency variation versus the output amplitude variation. The curve is generally called an S-curve. The input frequency variation and the output amplitude variation in the labeled region 11a have a linear relation. This is the working range of the FM/FSK demodulator. The shifted phase of the phase shifter 11 is required to be very precise to have larger demodulation gain of this circuit. To increase the strength of output signal and the noises of the FM/FSK demodulator, the conversion slope of the input frequency variation to the output amplitude variation can be increased. In practice, any device has its error coefficient. If the shifted phase of the phase shifter 11 has any deviation, it will result in the following problems:

(1) The conversion curve of the FM/FSK demodulator deviates from its normal linear region. This will distort the demodulation output signal, and the system cannot function normally. (2) In the narrow-band FM/FSK demodulating system, the conversion slope of the input frequency variation to the output amplitude variation has to be tuned up so as to obtain a sufficient output signal. However, it has very little tolerance to the device errors. Therefore, adjustments have to be performed during the production process. This complicates the manufacturing process. (3) In the low voltage and low power conditions for the narrow-band FM/FSK demodulating tasks, in addition to the larger conversion slope of the input frequency variation to the output amplitude variation, the limited work voltage also has small tolerance to direct current (DC) offsets. Even if adjustments are made in the production process, it is still difficult to increase the yield.

In U.S. Pat. No. 6,798,678, the patent uses an indirect means to adjust the shifted phase of the phase shifter for compensating the phase. It has two similar phase shifting circuits. The first phase shifting circuit is adjusted using a phase-locked loop (PLL), thereby indirectly adjusting the second phase shifting circuit. This is more complicated in the circuit structure. In fact, the adjusted results cannot be completely consistent. It also needs an extra oscillatory circuit that causes additional interference.

In U.S. Pat. No. 6,847,255, the phase shifter is integrated in a single chip, without any consideration of production errors. Therefore, it is only suitable for wide-band demodulation. With little error tolerance, it cannot be applied to narrow-band demodulation. Consequently, it has few applications.

Therefore, how to provide a FM/FSK demodulator that has a phase compensating function and can be integrated into a single chip is an important subject in the field.

SUMMARY OF THE INVENTION

In view of the foregoing, an object of the invention is to provide a FM/FSK demodulator. Through the dual feedback mechanism, it provides DC compensation and adjusts the magnitude of the alternate current (AC) signal, so it can overcome the problems of imprecise phase shifts and adjustments in production under low power and low voltage. Therefore, it has better performance in both wide-band and narrow-band demodulations.

To achieve the above object, the disclosed FM/FSK demodulator includes: a modulation signal input terminal, a tunable phase shifter, a multiplier, an adder, a DC compensation unit, and a demodulation signal output terminal.

The modulation signal input terminal is used to receive a first modulation signal. The phase shifter receives the first modulation signal and then changes its phase to output a second modulation signal. The phase shifter is a tunable phase shifter. The multiplier is coupled to the modulation signal input terminal and the phase shifter output terminal for multiplying the modulation signal and the modulation signal during phase shifter and outputting a demodulation signal. The adder has at least two input terminals and an output terminal. The first input terminal receives the demodulation signal. The DC compensation unit is coupled to the output terminal of the adder for compensating the DC of the compensation signal and the low-frequency offsets. The demodulation signal output terminal is coupled to the output terminal of the adder and outputs the demodulation signal.

To achieve the above object, another embodiment of the disclosed FM/FSK demodulator includes: a modulation signal input terminal, a tunable phase shifter, a multiplier, a peak locker, and a demodulation signal output terminal.

The demodulation signal input terminal receives a first modulation signal. The phase shifter receives the first modulation signal and then changes its phase to output a second modulation signal. The phase shifter is a tunable phase shifter. The multiplier is coupled to the modulation signal input terminal and the phase shifter output terminal for multiplying the first modulation signal and the second modulation signal together and outputting a demodulation signal. The peak locker is coupled to the output terminal of the multiplier to lock the peak signal of the demodulation signal and to output the peak signal to the phase shifter for controlling the phase shift. The demodulation signal output terminal is coupled to the output terminal of the multiplier and outputs the demodulation signal.

To achieve the above object, yet another embodiment of the invention includes: a modulation signal input terminal, a tunable phase shifter, a multiplier, an adder, a DC compensation unit, a peak locker, and a demodulation signal output terminal.

The modulation input terminal receives a first modulation signal. The phase shifter receives the first modulation signal and then changes its phase to output a second modulation signal. The phase shifter is a tunable phase shifter. The multiplier is coupled to the modulation signal input terminal and the phase shifter output terminal for multiplying the first modulation signal and the second modulation signal together and outputting a demodulation signal. The adder has at least two input terminals and one output terminal. The first input terminal receives the demodulation signal. The DC compensation unit is coupled to the output terminal of the adder for compensating the DC of the demodulation signal and low-frequency offsets. The peak locker is used to lock the peak signal of the demodulation signal and then to output the control signal to the phase shifter for controlling the phase shift to shift angle θ (θ=n*90°). θ is any angle. n is preferable an odd integer number). The demodulation signal output terminal is coupled to the output terminal of the multiplier and outputs the demodulation signal.

Using this FM/FSK demodulator, the dual feedback mechanism provides the function of DC compensation and AC signal adjustments. The demodulator therefore has the self-adjusting ability, increasing the precision of phase shifts and stabilizing the output signal at its maximum. All devices can be integrated in a single chip, achieving the high integratability of the FM/FSK demodulator.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow illustration only, and thus are not limitative of the present invention, and wherein.

DETAILED DESCRIPTION OF THE INVENTION

Figure 1:
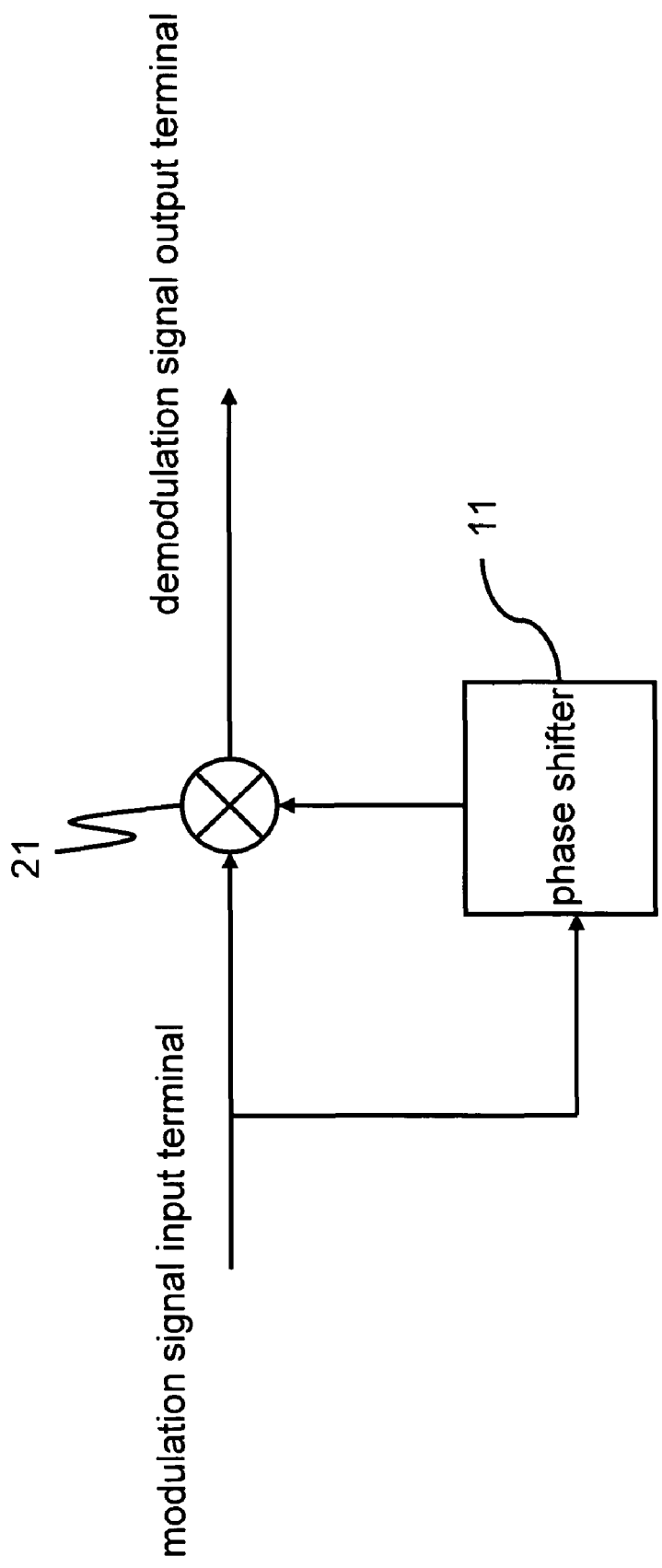
FIG. 1 is a block diagram showing the basic circuit structure of the FM/FSK demodulator in the prior art.
Figure 2:
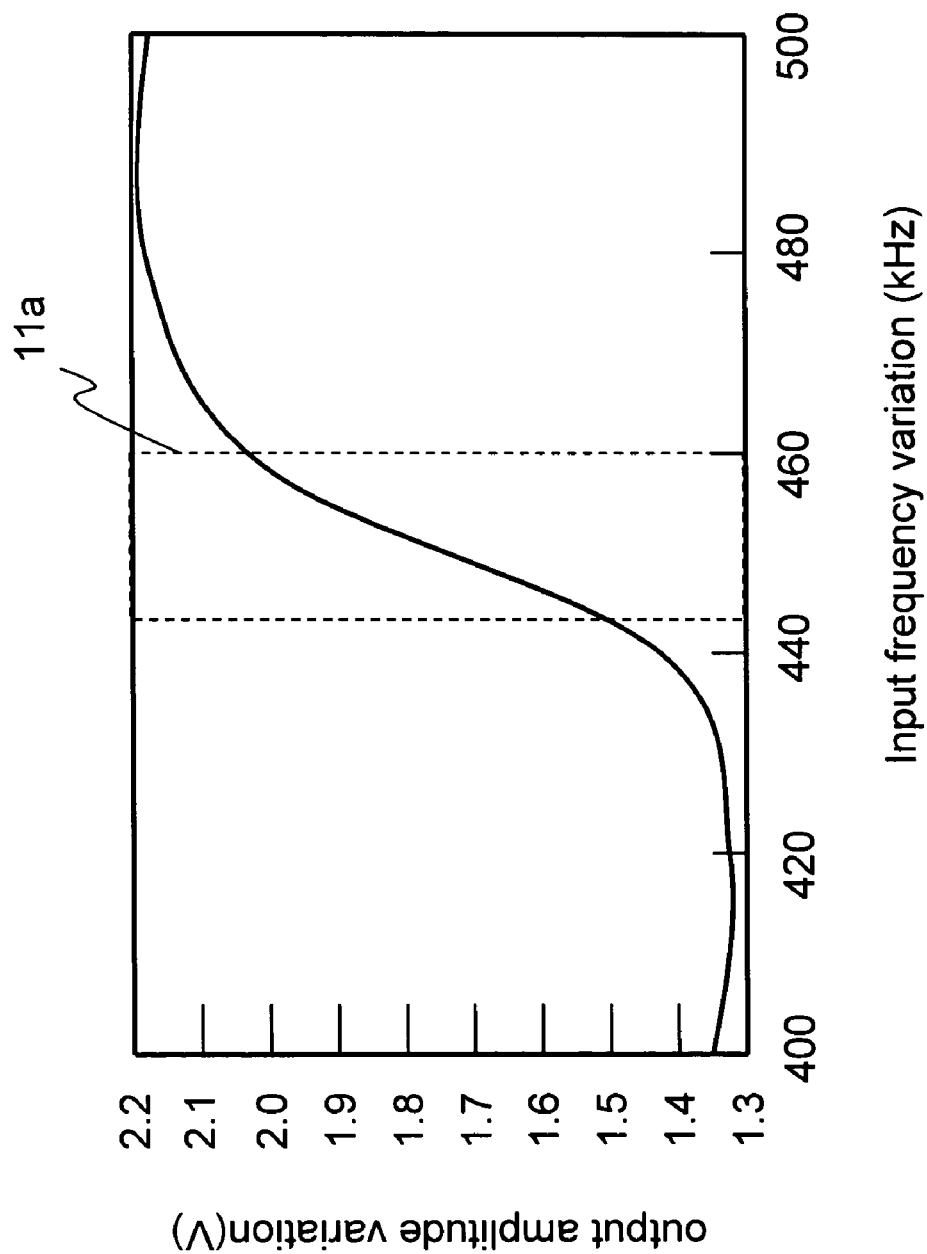
FIG. 2 is a schematic view showing the conversion curve of the input frequency variation versus the output amplitude variation in the prior art.
Figure 3A:
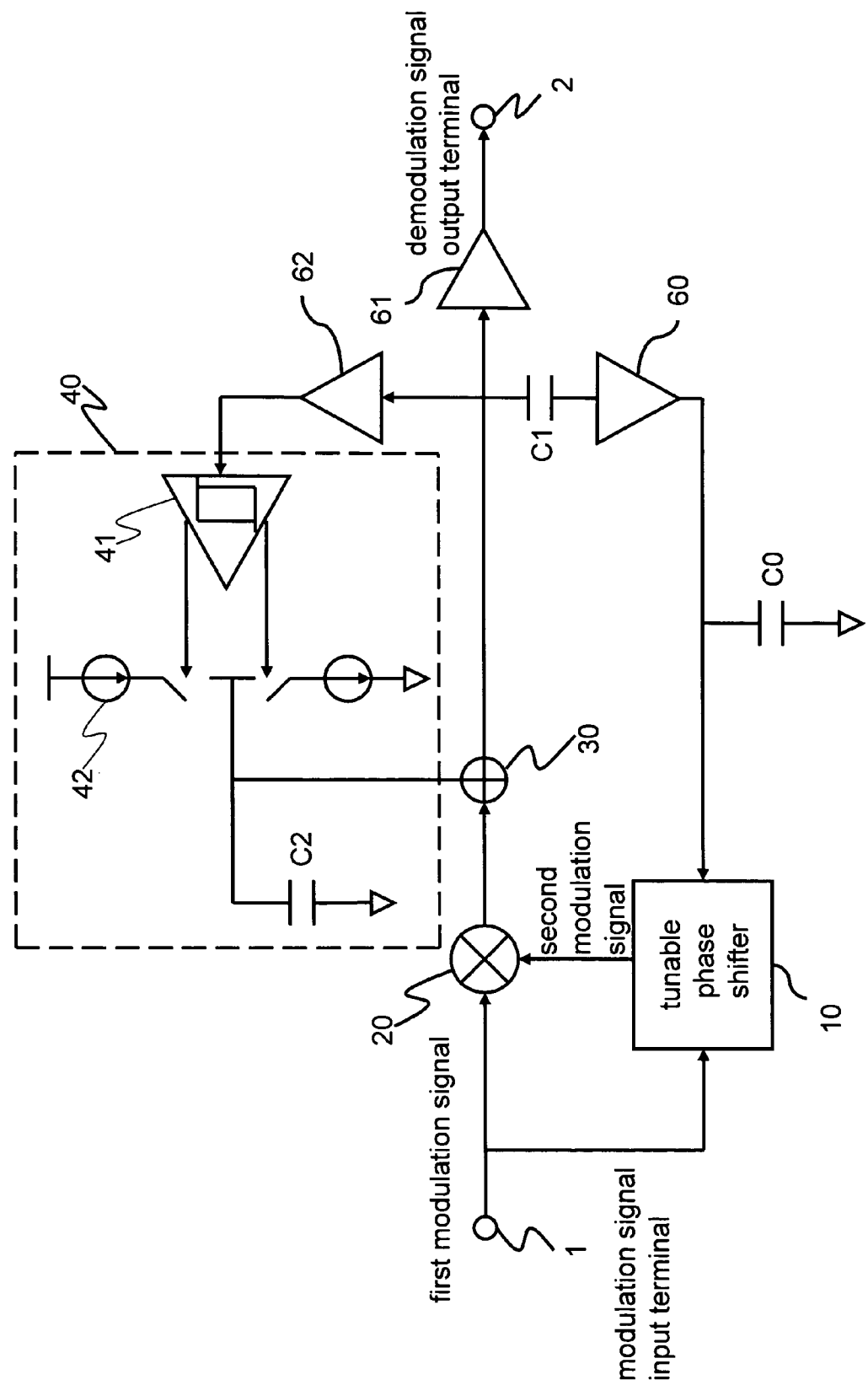
FIG. 3A is a circuit block diagram of the first embodiment.

FIG. 3A shows a circuit block diagram of a first embodiment of the invention. It contains a modulation signal input terminal 1, a tunable phase shifter 10, a multiplier 20, an adder 30, a DC compensation unit 40, and a demodulation signal output terminal 2.

The modulation signal input terminal 1 receives a first modulation signal (e.g., an FM/FSK modulation signal).

The tunable phase shifter 10 is coupled to the modulation signal input terminal 1 and has at least two input terminals and one output terminal. The first input terminal receives a first modulation signal, and then changes its phase to output a second modulation signal. The second input terminal of the tunable phase shifter 10 receives a feedback demodulation signal to correct the phase shift of the demodulation signal.

The multiplier 20 is coupled to the demodulation signal input terminal 1 and the output terminal of the tunable phase shifter 10, multiplies the first modulation signal with the second modulation signal, and then outputs a demodulation signal.

The adder 30 is coupled to the multiplier 20 and has at least two input terminals and one output terminal. The first input terminal receives the demodulation signal output by the multiplier 20, and its second input terminal receives the signal output by the DC compensation unit 40. It further adds the output signals of the multiplier 20 and the DC compensation unit 40.

The DC compensation unit 40 is coupled to the output terminal of the adder 30 for compensating the DC of the demodulation signal output by the adder 30 and low-frequency offsets. In practice, the DC compensation unit 40 can be a circuit composed of a Schmitt trigger 41, a current pump circuit 42, and a capacitor C2. In addition, the DC compensation unit may be a low-pass filter.

The demodulation signal output terminal 2 is coupled to the output terminal of the adder 30 for outputting the demodulation signal.

Besides, a buffer 62 is disposed between the output terminal of the adder 30 and the input terminal of the DC compensation unit 40. A buffer 61 is disposed between the output terminal of the adder 30 and the demodulation signal output terminal 2. Capacitors C0, C1 and a buffer 60 are disposed between the output terminal of the adder 30 and the second input terminal of the tunable phase shifter 10, wherein the capacitor C1 is coupled to the input terminal of the buffer 60 in series. The capacitor C0 is coupled in parallel between the output terminal of the buffer 60 and the second input terminal of the tunable phase shifter 10.

In the following, we explain the circuit performances of the FM/FSK demodulator.

First, the first modulation signal inputs to the multiplier 20 and the tunable phase shifter 10 via the modulation signal input terminal 1 and the connecting wire respectively. A second modulation signal is generated after the first modulation signal passes through the tunable phase shifter 10.

The first modulation signal and the second modulation signal are multiplied by the multiplier 20, outputting a demodulation signal. Then, the demodulation signal output by the multiplier 20 is transferred by the adder 30 to the input terminal of the DC compensation unit 40. The DC compensation unit 40 extracts the low-frequency offset of the demodulation signal to control the charging and discharging actions of the current pump circuit 42, thereby compensating the DC of the demodulation signal and low-frequency offsets.

The detailed circuit performances of the DC compensation unit 40 are as follows: the Schmitt trigger 41 compares the potential of the detected DC or low-frequency offset to know whether it is shifting upward or downward. The corresponding control signal is output to the current pump circuit 42. The current pump circuit 42 charges and discharges the capacitor C2 to compensate the DC of the demodulation signal and low-frequency offsets.

Figure 3B:
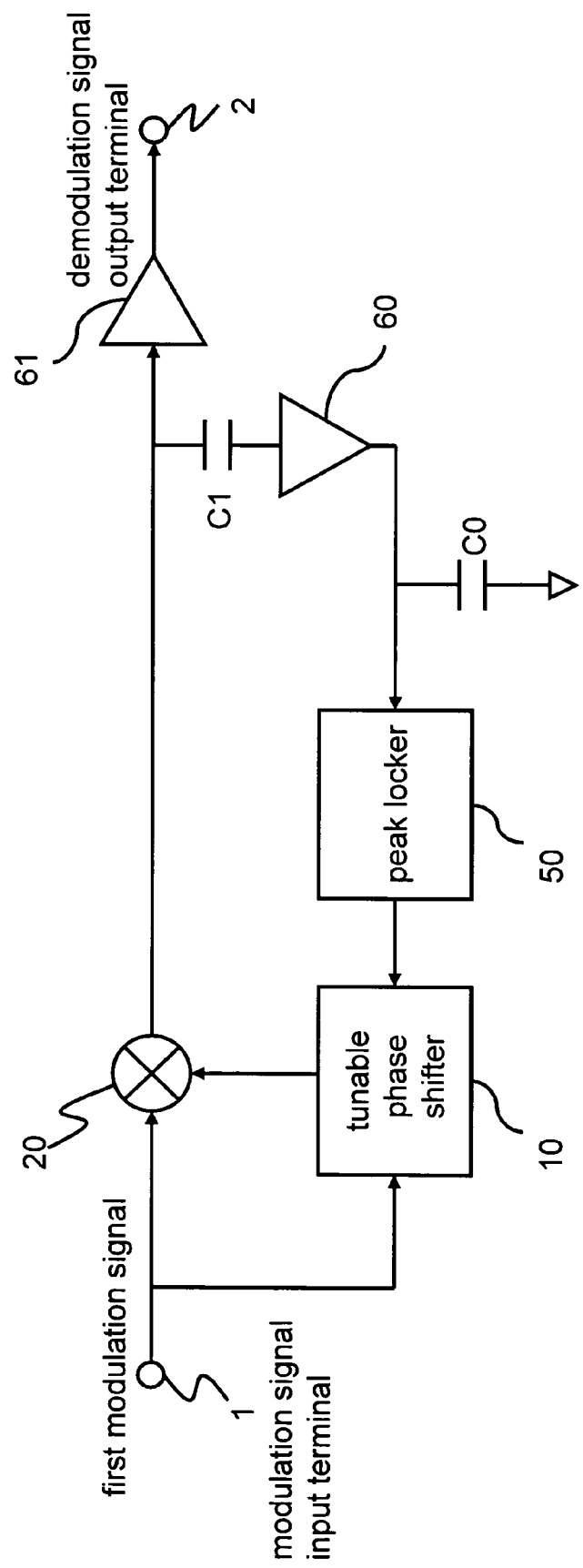
FIG. 3B is a circuit block diagram of the second embodiment.

The circuit block diagram of a second embodiment is shown in FIG. 3B. It contains: a modulation signal input terminal 1, a tunable phase shifter 10, a multiplier 20, a peak locker 50, and a demodulation signal output terminal 2.

The modulation signal input terminal 1 receives a first modulation signal (e.g., an FM/FSK modulation signal).

The tunable phase shifter 10 is coupled to the modulation signal input terminal 1 and has at least two input terminals and one output terminal. The first input terminal receives a first modulation signal, and then changes its phase to output a second modulation signal. The second input terminal of the tunable phase shifter 10 receives a feedback demodulation signal to correct the phase shift of the demodulation signal.

The multiplier 20 is coupled to the demodulation signal input terminal 1 and the output terminal of the tunable phase shifter 10, multiplies the first modulation signal with the second modulation signal, and then outputs a demodulation signal.

The peak locker 50 is coupled to the output terminal of the multiplier 20 to lock the peak signal of the demodulation signal and to output the peak signal to the tunable phase shifter 10, thereby controlling its phase shift.

The demodulation signal output terminal 2 is coupled to the output terminal of the multiplier 20 to output the demodulation signal.

Besides, a buffer 61 is disposed between the output terminal of the multiplier 20 and the input terminal of the peak locker 50. Capacitors C0, C1 and a buffer 60 are disposed between the output terminal of the multiplier 20 and the input terminal of the peak locker 50. The capacitor C1 is coupled in series to the input terminal of the buffer 60. The capacitor C0 is coupled in parallel between the output terminal of the buffer 60 and the input terminal of the peak locker 50.

The following paragraphs explain the circuit performances of the FM/FSK demodulator.

A first modulation signal inputs to the multiplier 20 and the tunable phase shifter 10 via the modulation signal input terminal 1 and a connecting wire respectively. A second modulation signal is generated after the first modulation signal passes through the tunable phase shifter 10.

The first modulation signal and the second modulation signal are multiplied by the multiplier 20, outputting a demodulation signal. The demodulation signal output by the multiplier 20 is transferred to the input terminal of the peak locker 50. The peak locker 50 extracts the peak value (maximum value) of the demodulation signal and sends it to the second input terminal of the tunable phase shifter 10, thereby optimizing the phase shift shifter 10.

Figure 3C:
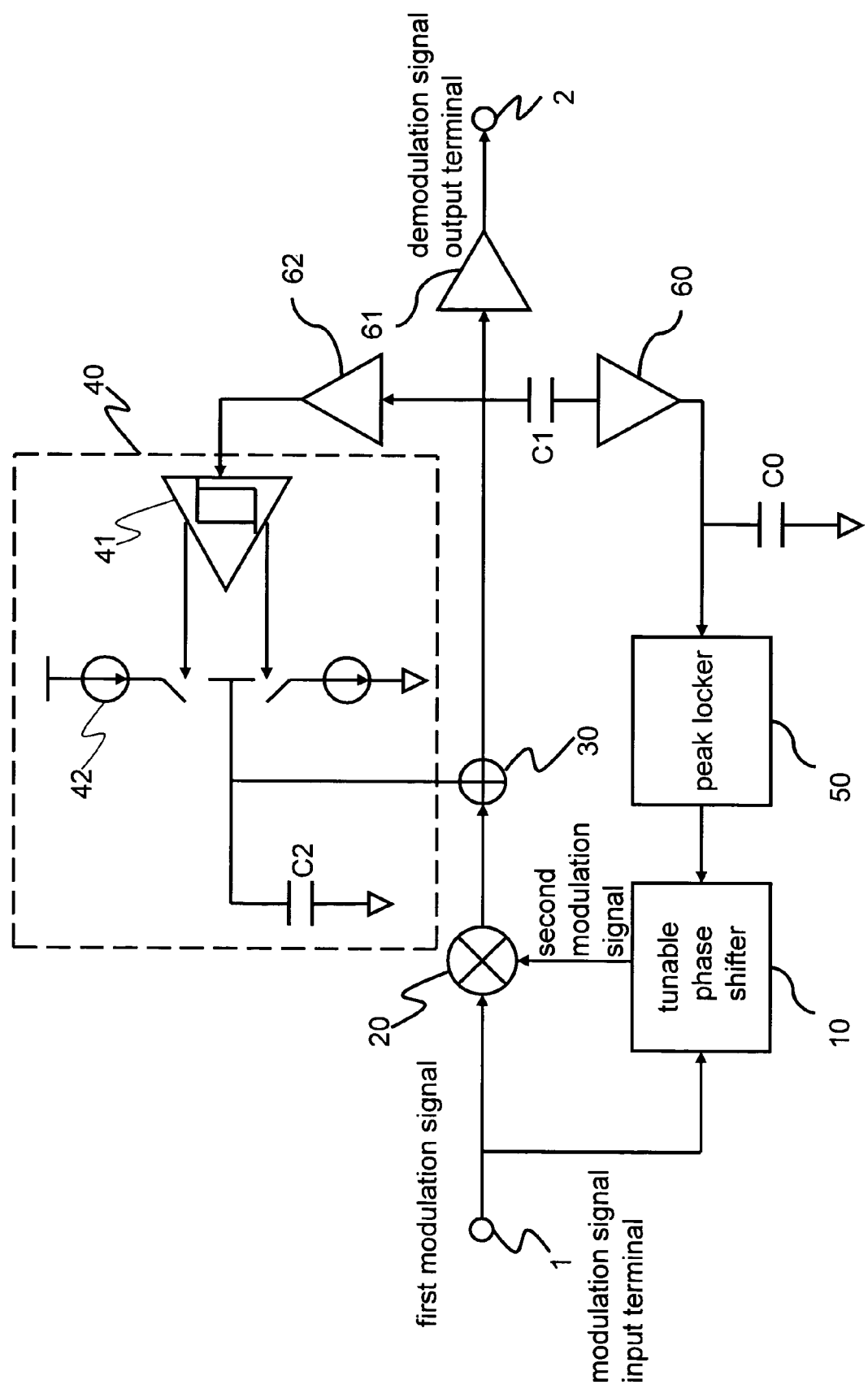
FIG. 3C is a circuit block diagram of the third embodiment.

With reference to FIG. 3C, the circuit of a third embodiment of the invention includes: a modulation signal input terminal 1, a tunable phase shifter 10, a multiplier 20, an adder 30, a DC compensation unit 40, a peak locker 50, and a demodulation signal output terminal 2.

The modulation signal input terminal 1 receives a first modulation signal (e.g., an FM/FSK modulation signal).

The tunable phase shifter 10 is coupled to the modulation signal input terminal 1 and has at least two input terminals and one output terminal. The first input terminal receives a first modulation signal, and then changes its phase to output a second modulation signal. The second input terminal of the tunable phase shifter 10 receives a feedback demodulation signal to correct the phase shift of the demodulation signal.

The multiplier 20 is coupled to the demodulation signal input terminal 1 and the output terminal of the tunable phase shifter 10, multiplies the first modulation signal with the second modulation signal, and then outputs a demodulation signal.

The adder 30 is coupled to the multiplier 20 and has at least two input terminals and one output terminal. The first input terminal receives the demodulation signal output by the multiplier 20, and its second input terminal receives the signal output by the DC compensation unit 40. It further adds the output signals of the multiplier 20 and the DC compensation unit 40.

The DC compensation unit 40 is coupled to the output terminal of the adder 30 for compensating the DC of the demodulation signal output by the adder 30 and low-frequency offsets. In practice, the DC compensation unit 40 can be a circuit composed of a Schmitt trigger 41, a current pump circuit 42, and a capacitor C2. In addition, the DC compensation unit may be a low-pass filter.

The peak locker 50 is coupled to the output terminal of the multiplier 20 to lock the peak signal of the demodulation signal and to output the peak signal to the tunable phase locker 10, thereby controlling the phase shift.

The demodulation signal output terminal 2 is coupled to the output terminal of the adder 30 for outputting the demodulation signal.

Besides, a buffer 62 is disposed between the output terminal of the adder 30 and the input terminal of the DC compensation unit 40. A buffer 61 is disposed between the output terminal of the adder 30 and the demodulation signal output terminal 2. Capacitors C0, C1, and a buffer 60 are disposed between the output terminal of the adder 30 and the input terminal of the peak locker 50. The capacitor C1 is coupled in series to the input terminal of the buffer 60. The capacitor C0 is coupled in parallel between the output terminal of the buffer 60 and the input terminal of the peak locker 50.

Since the third embodiment is the combination of the first and second embodiment, its circuit performances are not further explained herein.

The third embodiment mentioned above uses a dual feedback mechanism to process the demodulation signal so that the demodulation signal has the features of automatic frequency control (AFC), automatic demodulation sensitivity adjustments, low work voltage, and high S/N ratio. The above-mentioned devices can be integrated in a single chip or some of them are coupled externally to the single chip.

The disclosed FM/FSK demodulator utilizes the dual feedback mechanism to provide the abilities of DC compensation and AC signal adjustments. This self-adjusting feature increases the precision of phase shift and stabilizes the output signal at its maximum. All components can be integrated in a single chip, achieving a high integratability for the FM/FSK demodulator.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A frequency modulation-frequency shift keying (FM/FSK) demodulator, comprising:
   a modulation signal input terminal, which receives a first modulation signal;
   a phase shifter, which receives the first modulation signal, and then changes its phase to output a second modulation signal;
   a multiplier, which is coupled to the modulation signal input terminal and the output terminal of the phase shifter for multiplying the first modulation signal and the second modulation signal together and outputting a demodulation signal;
   an adder, which has a first input terminal, a second input terminal and one output terminal, the first input terminal receiving the demodulation signal;
   a direct current (DC) compensation unit, coupled to the output terminal of the adder for compensating the DC of the demodulation signal and low-frequency offsets, the DC compensation unit including a Schmitt trigger, a current pump circuit, and a capacitor, the Schmitt trigger receiving a signal from the output terminal of the adder and outputs a control signal, and the current pump circuit receiving the control signal to charge and discharge the capacitor at the second input terminal of the adder; and
   a demodulation signal output terminal, which is coupled to the output terminal of the adder for outputting the demodulation signal.

2. The FM/FSK demodulator of claim 1, wherein a buffer is disposed between the output terminal of the adder and the demodulation signal output terminal.

3. The FM/FSK demodulator of claim 1, wherein the DC compensation unit is a low-pass filter.

4. The FM/FSK demodulator of claim 1, wherein the phase shifter is a tunable phase shifter.

5. A frequency modulation-frequency shift keying demodulator, comprising:
- a modulation signal input terminal, which receives a first modulation signal;
- a phase shifter, which receives the first modulation signal, and then changes its phase to output a second modulation signal;
- a multiplier, which is coupled to the modulation signal input terminal and the output terminal of the phase shifter for multiplying the first modulation signal and the second modulation signal together and outputting a demodulation signal;
- an adder, which has a first input terminal, a second input terminal and one output terminal, the first input terminal receiving the demodulation signal;
- a DC compensation unit, which is coupled to the output terminal of the adder for compensating the DC of the demodulation signal and low-frequency offsets, the DC compensation unit including a Schmitt trigger, a current pump circuit, and a capacitor, the Schmitt trigger receiving a signal from the output terminal of the adder and outputs a control signal, and the current pump circuit receiving the control signal to charge and discharge the capacitor at the second input terminal of the adder; and
- a peak locker, which is coupled to the output terminal of the adder for locking a peak signal of the demodulation signal for outputting the control signal to the phase shifter for controlling its phase shift; and
- a demodulation signal output terminal, which is coupled to the output terminal of the adder for outputting the demodulation signal.

6. The FM/FSK demodulator of claim 5, wherein a buffer is disposed between the output terminal of the adder and the demodulation signal output terminal.

7. The FM/FSK demodulator of claim 5, wherein the DC compensation unit comprises of a low-pass filter.

8. The FM/FSK demodulator of claim 5, wherein a capacitor and a buffer are disposed between the output terminal of the adder and the input terminal of the peak locker.

9. The FM/FSK demodulator of claim 5, wherein a buffer is disposed between the output terminal of the adder and the DC compensation unit.

10. The FM/FSK demodulator of claim 5, wherein the phase shifter is a tunable phase shifter.

* * * * *